United States Patent [19]
Rancourt et al.

[11] 4,229,066
[45] Oct. 21, 1980

[54] VISIBLE TRANSMITTING AND INFRARED REFLECTING FILTER

[75] Inventors: James D. Rancourt, Santa Rose; William T. Beauchamp, Windsor, both of Calif.

[73] Assignee: Optical Coating Laboratory, Inc., Santa Rosa, Calif.

[21] Appl. No.: 944,136

[22] Filed: Sep. 20, 1978

[51] Int. Cl.$^3$ .............................................. G02B 5/28
[52] U.S. Cl. ...................... 350/1.6; 350/164
[58] Field of Search ......................... 350/1.6, 164, 166

[56] References Cited

U.S. PATENT DOCUMENTS

| | | | |
|---|---|---|---|
| 3,279,317 | 10/1966 | Ploke | 350/1.6 |
| 3,519,339 | 7/1970 | Hutchinson et al. | 350/1.6 |
| 3,697,153 | 10/1972 | Zycha | 350/1.6 |

Primary Examiner—Ronald J. Stern
Attorney, Agent, or Firm—Flehr, Hohbach, Test, Albritton & Herbert

[57] ABSTRACT

Visible transmitting and infrared reflecting filter having a substrate formed of a material capable of transmitting visible light or absorbing visible light and having a surface and a coating carried by the surface of the substrate. The coating comprises at least one period of a multilayer stack which is reflecting in the infrared and transmitting at shorter wavelengths. The period is formed of a plurality of layers of high and low index materials with alternate layers being formed of materials having a high index of refraction and the other layers being formed of materials having a low index of refraction. At least one anti-reflection layer is disposed between adjacent layers of the period for matching the layers of the period to each other in the visible so that the transmission of the filter is relatively high over a relatively wide wavelength band at shorter wavelengths while maintaining high reflection and low absorption at the longer wavelengths.

14 Claims, 7 Drawing Figures

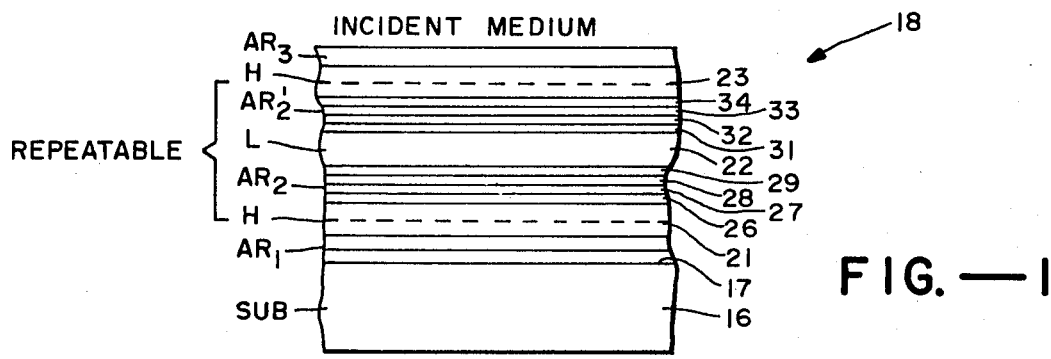
FIG.—1
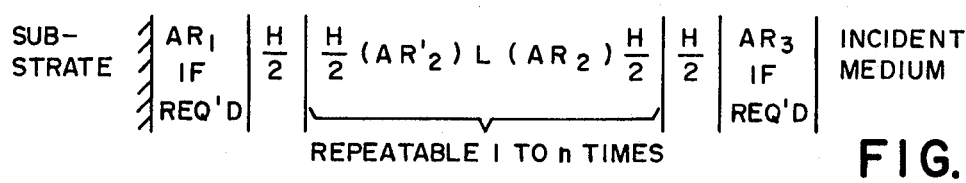
FIG.—2
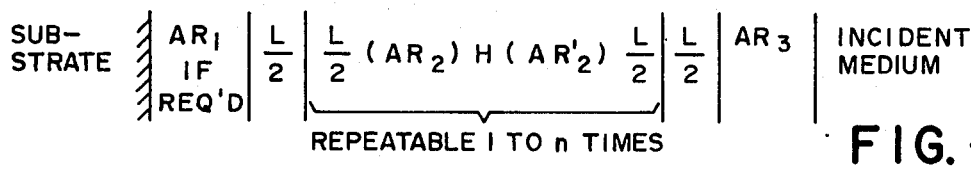
FIG.—3
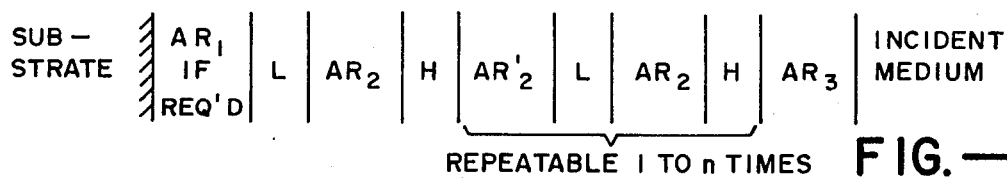
FIG.—4
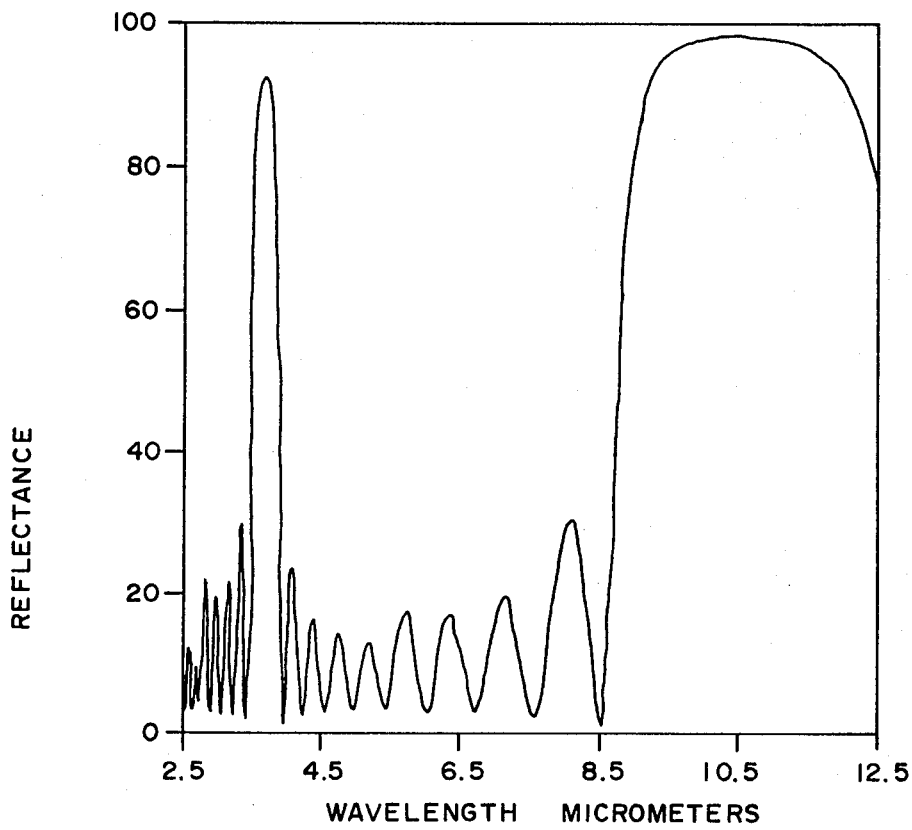
FIG.—5

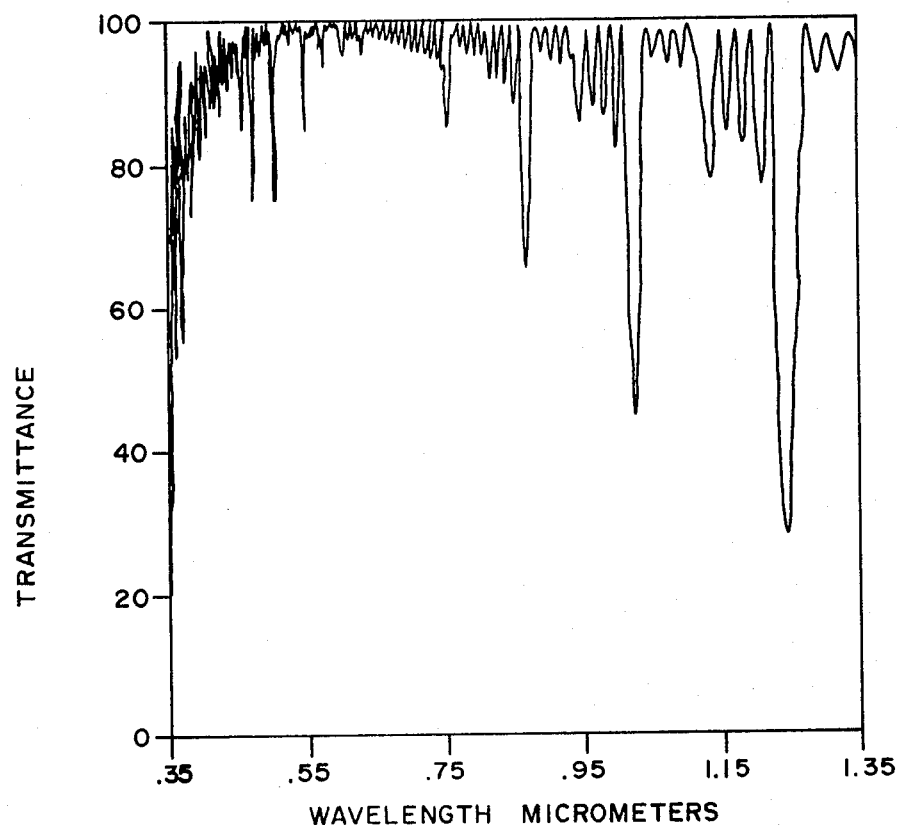
FIG.—6
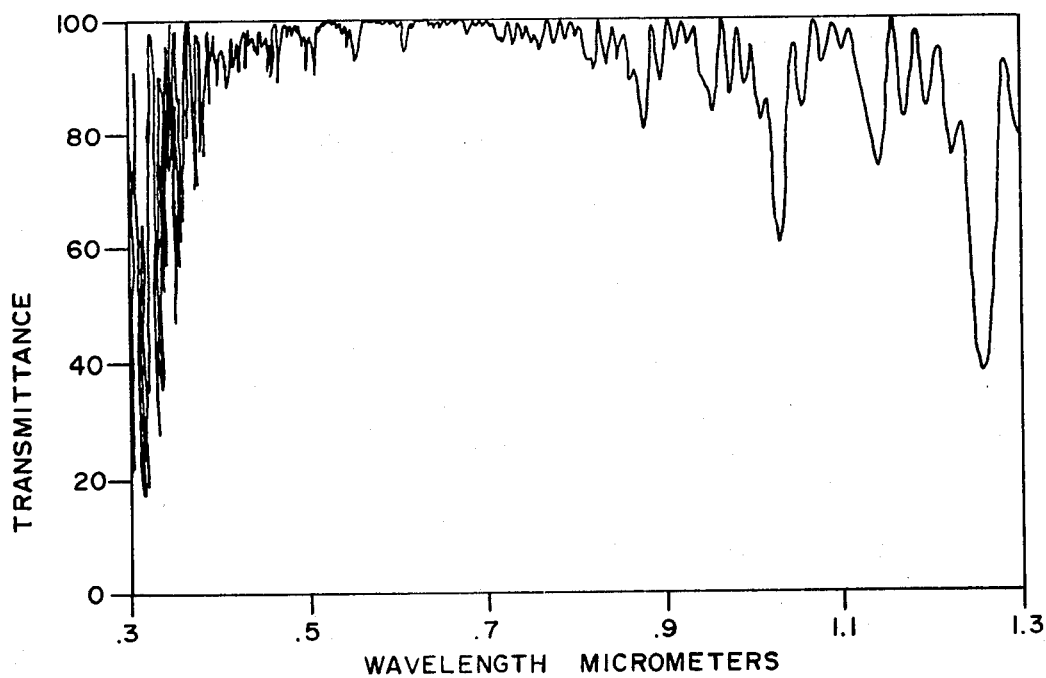
FIG.—7

VISIBLE TRANSMITTING AND INFRARED REFLECTING FILTER

BACKGROUND OF THE INVENTION

Infrared reflecting filters have heretofore been provided which have been formed of standard quarterwave stacks; however, it has been found that in such filters many high reflecting bonds will appear throughout the visible spectrum thus rendering visible transmission relatively low on the average. There is therefore a need for a new and improved visible transmitting and infrared reflecting filter.

SUMMARY OF THE INVENTION AND OBJECTS

The visible transmitting infrared reflecting filter is comprised of a substrate formed of a material which is capable of transmitting or absorbing light at shorter wavelengths i.e. visible light and which is provided with a surface. A coating is carried by the surface. The coating is comprised of a quarter wave infrared reflecting stack. The stack is formed of a plurality of periods which are designed for reflecting in the infrared and for transmitting in the visible. Each basic period of the stack is formed of high and low index materials with alternate layers being formed of high index materials and other layers being formed of low index materials. In order to minimize absorption as much as possible, the materials should be nonabsorbing at longer wavelengths where reflectance is desired. For applications requiring transmittance at the shorter wavelengths, the materials should be nonabsorbing in the spectral region as well. The high and low index layers of each period have optical thicknesses corresponding to the longer wavelength region where high reflectance is desired. Therefore, these are called the thick layers. The high index material can be zinc sulphide or alternatively zinc selenide. The low index material can be thorium fluoride. Other suitable low index materials are lead fluoride, magnesium fluoride and strontium fluoride. At least one anti-reflection layer is disposed between adjacent layers of the period for matching the indices of refraction of the materials at the shorter wavelengths so that the reflection of the filter at the shorter wavelengths is relatively low for the filter while maintaining high reflection and low absorption at longer wavelengths maintaining high reflection and low absorption in the infrared.

In general, it is an object of the present invention to provide a filter with low reflection at shorter wavelengths and high reflection at longer wavelengths.

Another object of the invention is to provide a filter of the above character in which anti-reflection layers are provided within the infrared reflecting period of the filter for matching the thick layers in the period to each other in the visible region.

Another object of the invention is to provide a filter of the above character in which the anti-reflection layers have high transmission with relatively high reflection and low absorption in the infrared.

Another object of the invention is to provide a filter of the above character which is provided with a plurality of periods to provide a quarterwave stack in the infrared.

Another object of the invention is to provide a filter of the above character in which the thicknesses of the thick layers in certain of the periods are altered so that the higher orders of visible interference phenomena are not added constructively in the filter.

Additional objects and features of the invention appear from the following description in which the preferred embodiments are set forth in detail in connection with the accompanying drawings.

BRIEF DESCRIPTION OF THE DRAWINGS

FIG. 1 is a cross-sectional view of the filter incorporating the present invention.

FIG. 2 is a graphic representation of the design used in the filter of the present invention using a symmetric period in expressing the design.

FIG. 3 is a graphic representation of the design used in the filter of the present invention using an alternative form of a symmetric period in expressing the design.

FIG. 4 is a graphic representation of the design used in the filter of the present invention using a period of layer pairs in expressing the design.

FIG. 5 is a graph showing reflectance in the infrared region of a filter designed for infrared reflectance and visible transmittance.

FIG. 6 is a graph for the same filter as in FIG. 5 showing the transmittance in the visible and near infrared regions.

FIG. 7 is a graph similar to FIG. 6.

DESCRIPTION OF THE PREFERRED EMBODIMENTS

The filter which is shown in FIG. 1 of the drawings consists of a substrate 16. When the filter is to be used as a visible transmitting filter, the substrate must necessarily be formed of a material such as fused silica, sapphire and zinc sulphide and any other material capable of transmitting a wide band shorter wavelength region such as the visible region. When the filter to be used as a collector, an opaque material such as black gold, chrome or nickel capable of absorbing the wide band shorter wavelength region is used. Typically, the substrate is provided with a planar optical surface 17. A coating 18 is carried by the surface 17 and preferably is formed thereon.

The coating 18 consists of at least one period and preferably a plurality of periods as for example, three or more to form a quarterwave stack for reflecting a longer wavelength region. Typically the longer wavelength region is five times or more greater than the shorter wavelength region in which high transmittance is desired.

Each period is formed of a plurality of thick layers formed of high and low index materials with alternate layers being formed of high index materials and the other layers being formed of low index materials. Thus, by way of example, the thick layers can be arranged high-low-high respectively or alternatively low-high-low.

From the design which is shown in FIG. 2, it can be seen that the period which is a symmetric period is comprised of one half layer of H, a full layer of L, and a one-half layer of H. The two intraperiod, multi-layer anti-reflectors are identified as $AR_2$ and $AR'_2$. Thus, it can be seen that when the period is repeated that one-half layer of H on each end of the period would combine to provide a full thickness layer of H where the two periods adjoin each other. If an alternate arrangement is utilized as shown in FIG. 3, the half layers would have half layers of L with the full layer being a full thickness layer of H. The end layers of the first and last symmetric periods should be completed by including additional half thickness layers as shown in FIGS. 2 and 3 respectively.

It also should be appreciated that the designs which are shown in FIGS. 2 and 3 can be viewed in another manner as shown in FIG. 4 in which the period is comprised of a full thickness layer of H and a full thickness layer of L with the intraperiod anti-reflector $AR_2$ being disposed between the H and L layers on the substrate side of the H layer and the intralayer anti-reflector $AR'_2$ being disposed adjacent to the H and L layers on the incident medium side of the H layer. When this period is repeated, the full thickness L layer would be separated from the H of the preceding period by the intraperiod anti-reflector $AR'_2$. The design is then completed on the substrate side by adding a pair of L and H layers separated by an intraperiod anti-reflector $AR_2$ as shown in FIG. 4. It should be appreciated that an equivalent filter could be constructed by interchanging the occurrence of H and L layers and of the intraperiod anti-reflectors.

Each of the thick layers is designed to have a quarterwave optical thickness in the wavelength of interest in the infrared plus or minus approximately fifteen percent. The high and low index layers normally would have equal optical thicknesses but as pointed out below, the high and low index layers can have predetermined ratios with respect to each other as for example 2 to 1 or 3 to 1. The materials which are utilized should be nonabsorbing in both the visible and the infrared. For the high index material, zinc sulphide having an index of refraction of 2.39 can be used. Alternatively, zinc selenide having an approximate index of refraction of 2.4 and tantalum pentoxide having an index of refraction of 2.0 can be utilized. In general, by a high index of refraction is meant materials having indices of refraction greater than about 1.7. For the low index material, thorium fluoride having an index of refraction of 1.58 can be utilized. Alternatively, lead fluoride having an 1.75, magnesium fluoride having an index of refraction of 1.38, sodium fluoride having an index of refraction of 1.25, strontium fluoride having an index of refraction of 1.36 and fused silica having an index of refraction of 1.45 can be used. In general, by low index of refraction materials is meant those materials having indices of refraction less than about 1.7.

With respect to the infrared reflecting capabilities, an appropriate design wavelength would be 10.6 micrometers which would be a typical one for rejecting carbon dioxide laser lines. Alternatively, the filter could be designed for rejecting carbon monoxide laser lines which occur at 5.3 micrometers, hydrogen fluoride laser lines at 2.7 micrometers or deuterium fluoride laser lines at 3.8 micrometers. Preferably, both of the high index layers would be designed for the same quarterwave optical thickness with a period as identified in FIG. 2.

The 10.6 micrometer filter is of principal importance because the carbon dioxide laser is one of the most efficient lasers available at the present time and with the largest power capabilities. It should be appreciated, however, that the present invention has equal application to other lasers as hereinabove pointed out.

In order to increase the transmission of the filter in the visible at least one anti-reflection layer is disposed between adjacent thick layers for the the indices of refraction in the visible spectrum of the materials for the thick layers of the infrared reflection period so that the transmission is relatively high while maintaining high reflection and low absorption in the infrared.

The intraperiod anti-reflectors in the design which are shown in FIG. 2 are identified as $AR_2$ and $AR'_2$. Each is comprised of four layers the design of which could have a combined quarterwave optical thickness centered in the visible portion of the spectrum, that is, at approximately 0.55 microns. For the anti-reflector $AR_2$, the alternate layers are formed of a high index material and the other layers are formed of a low index material. Thus for $AR_2$ the arrangement of the layers can be H/L/H/L where the layers can have optical thicknesses of approximately 0.1, 0.2, 0.2 and 0.1 micrometers respectively. These thicknesses can vary within plus or minus twenty-five percent and still achieve satisfactory results. The anti-reflector $AR'_2$ is designed in a similar manner except that the layers are arranged L/H/L/H.

The anti-reflection layers are normally formed of the same materials as the layer in the infrared reflecting period. However, other materials can be utilized as for example tantalum pentoxide ($Ta_2O_5$) for a high index material and lead fluoride ($PbF_2$) as a low index material.

The anti-reflection stack can be made up of a minimum of one layer and a combination of additional layers such as two, three, four, or more layers depending upon the application. In the case of a single layer, it would be necessary that it be formed of a material which is different from the infrared stack so that it can retain anti-reflection properties. Otherwise, it should be appreciated that if it were of the same material it would disappear into the infrared stack and optically would have no anti-reflection properties. The anti-reflection layers or stacks $AR_2$ and $AR'_2$ are preferably formed in accordance with the present invention of four layers with alternate layers being layers formed of a material having a high index of refraction and the other layers being formed of material having a low index of refraction. The materials which are utilized for these layers preferably have low absorption in the visible and in the infrared.

The thick layers forming an infrared reflecting period are identified as layers 21, 22 and 23 respectively in FIG. 1 in which layer 21 is formed of a material having a high index of refraction, layer 22 of a material having a low index of refraction and layer 23 of a material having a high index of refraction.

As shown in FIG. 1, the intraperiod, anti-reflector $AR_2$ is comprised of the layers 26, 27 and 28 and 29 and are formed of the same high and low index materials as the thick layers of the infrared reflecting period. As pointed out above, the combined optical thickness for all four layers is substantially one quarter of the wavelength for a design centered at 0.55 micrometers which is midway in the visible region from approximately 0.4 to 0.7 micrometers.

Similarly, the anti-reflector $AR'_2$ is formed by layers 31, 32, 33 and 34 and is arranged in the same manner as hereinbefore described and with the same design parameters as the anti-reflector $AR_2$.

The filter is also comprised of a plurality of periods hereinbefore described as for example three or more. In addition, each filter is provided with means for matching the periods with the substrate and for matching the period incident medium which in this case is assumed to be air.

Thus, there is provided an anti-reflector $AR_1$ which is comprised of the one or more layers of suitable materials and matches the period to the substrate.

In order to reduce the visible reflectance an anti-reflector $AR_3$ can be provided for matching the infrared reflector into the incident medium which in this case is assumed to be air. This anti-reflector also can be comprised of one or more layers formed of materials having suitable indices of refraction for matching the period to air.

A specific filter incorporating the present invention and the design shown in FIG. 4 is set forth below which is comprised of forty-seven layers with three periods forming a quarterwave stack for the infrared reflector.

| Layer | Index | | Physical Thickness (μm) | |
|---|---|---|---|---|
| | Air | | Incident Medium | |
| 1 | 1.58 | } $AR_3$ | 0.0915 | |
| 2 | 2.39 | | 1.1380 | |
| 3 | 1.58 | ⎫ | 0.0152 | ⎫ |
| 4 | 2.39 | ⎬ $AR_2$ | 0.0298 | |
| 5 | 1.58 | ⎭ | 0.0396 | |
| 6 | 2.39 | ⎫ | 0.0133 | One |
| 7 | 1.58 | | 1.1717 | period |
| 8 | 2.39 | ⎭ | 0.0133 | |
| 9 | 1.58 | ⎫ | 0.0396 | |
| 10 | 2.39 | ⎬ $AR_2'$ | 0.0298 | |
| 11 | 1.58 | ⎭ | 0.0152 | ⎭ |

Layers 2 through 11 are repeated 3 more times, and then the design continues:

| Layer | Index | | Physical Thickness (μm) |
|---|---|---|---|
| 42 | 2.39 | | 1.1380 |
| 43 | 1.58 | ⎫ | 0.0152 |
| 44 | 2.39 | ⎬ $AR_2$ | 0.0298 |
| 45 | 1.58 | | 0.0396 |
| 46 | 2.39 | ⎭ | 0.0133 |
| 47 | 1.58 | | 1.1717 |
| | fused silica | | substrate |

The materials utilized in the reflector are zinc sulfide having an index of refraction of 2.39 and thorium fluoride having an index of refraction of 1.58.

Plots of reflectance and transmittance for this specific design are provided in FIGS. 5 and 6. The reflectance plot in FIG. 5 is for the infrared portion of the spectrum with the peak centered at approximately 10.5 microns being the principal one for the application. The secondary peak near 3.7 microns can also be placed near 5.0 microns instead of where shown on this plot by changing the ratio of the optical thickness of the high and low index thick layers of the infrared reflecting periods. The transmittance which is shown in FIG. 6 includes a portion of the spectrum to which the human eye and the silicon types of solar cells are sensitive. It shows that the high order reflection bands in the visible spectrum have been measurably reduced by this design.

By modifying the design herein disclosed, an improved spectral performance can be obtained from the filter. The design consists of systematically altering the thicknesses of the thick or principal or non anti-reflecting layers. By way of example, the design hereinbefore disclosed as shown in FIG. 4 has a set of high index and low index layer pairs or periods whose quarter wave optical thicknesses corresponds to the infrared wavelengths. The layers which comprise the constituent layers of the aforementioned pairs are the "thick layers" previously referred to. These layer pairs have a nominal center wavelength represented by $\lambda_o$. As pointed out above, between each of these high and low layers is a set of thin anti-reflection layers which match indices of the high and low index materials over a selected portion of the spectrum at shorter wavelengths, as for example the visible portion but not limited to it.

In accordance with the modification of the present invention, decreased reflection is obtained in the shorter wavelength region of the spectrum by adjusting the thicknesses in pairs of the thick layers to reposition higher order reflectance peaks which occur in the short wavelength portions of the spectrum where low reflectance is desired. This repositioning allows for more complete anti-reflection treatment.

Starting from the nominal thickness, $\lambda_o$, the optical thickness of each thick layer pair is adjusted by an incremental factor, f, given by the equation $$f = 1/m \times 1/p$$

where m is the interference order of one nominal period in the region where the low reflectance is desired, and p is the number of periods (layer pairs) in the design.

This factor f changes the center wavelength of each period to $$\lambda = (1 + nf)\lambda_o$$

where n takes on the values in the range $-(p-1)/2$ to $+(p-1)/2$. The actual values for n for an even number of periods are in the series $n = \pm 1/2, \pm 3/2, \pm 5/2, \ldots +(p-1)/2$. For an odd number of periods, $n = 0, \pm 1, \pm 2, \ldots \pm(p-1)/2$.

The above equation specifies the shift in each of the layer pairs as follows. The spacing between interference orders decreases as the order number increases.

The equation specifies the shift in each of the layer pairs as follows. The spacing between interference orders decreases as the order number increases. Therefore, it is necessary to scale the shift by the order number where the repositioning of the peaks is desired. As an example, an infrared period with an optical thickness at 10.0 micrometers will have its twentieth order at 0.5 micrometers. Its nineteenth and twenty-first orders will be at 10/19 μm and 10/21 μm. The object of the repositioning is to space the orders from the other periods in the stack between these; thus, the factor of 1/m. Since there are p periods in the design, it is desired to space p peaks between each of these orders, so it is necessary to form the product of these two terms to obtain the incremental factor f. As a result of these adjustments, the thicknesses of the layer pairs are changed by a small amount from the nominal value, but in such a way that the average value of the changes remains at the nominal value. Thus, the infrared spectral reflectance remains essentially unchanged while the visible reflectance is reduced.

A spectral plot of the results which can be obtained with this modification of the present design listed above is shown in FIG. 7. When comparing this with FIG. 6, it can be seen that an increase in transmission is provided in the wavelength region from 0.5 to 0.8 microns which results from decreased reflectance at the higher order reflectance bands.

From the foregoing it can be seen that there has been provided a visible transmitting and infrared light reflecting filter which has a high transmittance in the visible region and which at the same time has a relatively high reflectance and low absorptance in the infrared region. It also can be seen that by varying the thickness of the thick layers in layer pairs, higher orders of the infrared reflecting periods do not interfere constructively in the filter so as to reduce the reflectance in the visible region of the spectrum.

What is claimed is:

1. In a filter which is reflecting at a longer wavelength region and transmitting over a wide band shorter wavelength region, a substrate having a surface, and a coating carried by the surface comprising at least one period which is reflecting at longer wavelengths and transmitting in a wide band of shorter wavelengths, each period being formed of a plurality of thick layers of high and low index materials with alternate layers being formed of a material having a high index of refraction and other layers being formed of a material having a low index of refraction, at least one thin anti-reflection layer disposed between adjacent thick layers for matching the thick layers of the period to each other in the shorter wavelength region so that the transmission of the filter is relatively high in the shorter wavelength region while maintaining high reflection and low absorption in the longer wavelength region.

2. A filter as in claim 1 wherein the substrate is formed of a material capable of transmitting the shorter wavelength region.

3. A filter as in claim 1 wherein the substrate is formed of a material capable of absorbing the shorter wavelength region.

4. A filter as in claim 1 wherein the thick layers in the period have a quarterwave optical thickness for a design wavelength in the longer wavelength region.

5. A filter as in claim 1 wherein a set of anti-reflection layers is disposed between the adjacent thick layers of the period to reduce the reflection in the shorter wavelength region.

6. A filter as in claim 1 wherein said at least one anti-reflection layer is a set of thin anti-reflection layers formed of high and low index materials.

7. A filter as in claim 1 wherein the low and high index materials utilized in the thin anti-reflection layers are the same as the high and low index materials used in the thick layers.

8. A filter as in claim 1 wherein said high index materials are selected from the group comprising zinc sulphide, zinc selenide and tantalum pentoxide and wherein the low index materials are selected from sodium fluoride, lead fluoride, magnesium fluoride, thorium fluoride, strontium fluoride and fused silica.

9. A filter as in claim 1 wherein the longer wavelength region is the infrared region and wherein the shorter wavelength region is the visible region.

10. A filter as in claim 1 wherein the period for reflecting the longer wavelengths is in the form of layered pairs, each layered pair comprising a high index layer and a low index layer.

11. A filter as in claim 1 wherein a plurality of periods are provided and in which each period is symmetric with the following order of layers—half thickness high index layer, a set of anti-reflection layers, a low index layer, a set of anti-reflection layers, and a half thickness high index layer.

12. A filter as in claim 1 wherein a plurality of periods are provided and in which each period is symmetric with the following order of layers—a half thickness low index layer, a set of anti-reflection layers, a high index layer, a set of anti-reflection layers and a half thickness low index layer.

13. A filter as in claim 1 wherein a period is a layered pair arranged so that there is provided in the following order a high index layer, a set of anti-reflection layers, a low index layer, and a set of anti-reflection layers.

14. A filter as in claim 1 wherein the optical thickness of the thick layer pairs in each period for the infrared is altered according to the formula:

$$\lambda_n = (1 + nf)\lambda_o$$

where
$\lambda_n$ is the optical thickness of a pair of high and low index layers
$\lambda_o$ is the normal quarterwave optical thickness
n is the period indicator
and f is given the equation $$f = 1/m \times 1/p$$

where m is the order number were low reflectance is desired,
and p is the number of periods in the design.

* * * * *